US008222561B2

(12) United States Patent
Renault et al.

(10) Patent No.: US 8,222,561 B2
(45) Date of Patent: Jul. 17, 2012

(54) DRAG TIP FOR A PLASMA CUTTING TORCH

(75) Inventors: Thierry R. Renault, West Lebanon, NH (US); Nakhleh A. Hussary, West Lebanon, NH (US); Christopher J. Conway, Wilmot, NH (US); Darrin H. MacKenzie, Windsor, VT (US)

(73) Assignee: Thermal Dynamics Corporation, West Lebanon, NH (US)

( * ) Notice: Subject to any disclaimer, the term of this patent is extended or adjusted under 35 U.S.C. 154(b) by 511 days.

(21) Appl. No.: 11/850,014

(22) Filed: Sep. 4, 2007

(65) Prior Publication Data

US 2009/0057277 A1 Mar. 5, 2009

(51) Int. Cl.
*B23K 10/00* (2006.01)

(52) U.S. Cl. ........... 219/121.5; 219/121.39; 219/121.48; 219/121.51; 219/75; 219/121.59; 313/231.41

(58) Field of Classification Search ............. 219/121.39, 219/121.45, 121.44, 121.48, 121.49, 121.51, 219/121.5, 121.52, 75, 121.59; 313/231.31, 313/231.41; 315/111.21
See application file for complete search history.

(56) References Cited

U.S. PATENT DOCUMENTS 4,716,269 A * 12/1987 Carkhuff .................. 219/121.51
5,013,885 A 5/1991 Carkhuff et al.
5,208,448 A * 5/1993 Everett ........................ 219/121.5
5,216,221 A * 6/1993 Carkhuff .................. 219/121.51
5,266,776 A 11/1993 Boisvert et al.
5,591,357 A * 1/1997 Couch et al. ............. 219/121.39
5,726,415 A 3/1998 Luo et al.
5,856,647 A 1/1999 Luo
6,403,915 B1 * 6/2002 Cook et al. ............... 219/121.52
6,667,459 B1 12/2003 Woods et al.
6,774,336 B2 8/2004 Horner-Richardson et al.
6,914,211 B2 7/2005 Brasseur et al.
6,969,819 B1 * 11/2005 Griffin ..................... 219/121.48
7,145,099 B2 12/2006 Horner-Richardson et al.
7,326,874 B2 * 2/2008 Brasseur et al. ........... 219/121.5
2004/0232118 A1 * 11/2004 Horner-Richardson et al. ........................ 219/121.48

* cited by examiner

*Primary Examiner* — Mark Paschall
(74) *Attorney, Agent, or Firm* — Brinks Hofer Gilson & Lione

(57) ABSTRACT

A drag tip for use in a plasma cutting torch is provided that includes an inner tip portion defining a distal end face, an inner cavity through which a plasma gas flows, and an orifice disposed between the distal end face and the inner cavity. An outer tip portion surrounds the inner tip portion and defines an inner chamber to accommodate a flow of secondary gas and also a distal end portion. The distal end face of the inner tip portion is adapted for contact with a workpiece and extends distally beyond the distal end portion of the outer tip portion, and the flow of secondary gas exits the outer tip portion proximate the distal end portion. Variations of the drag tip and methods of operation are also provided.

25 Claims, 12 Drawing Sheets

DRAG TIP FOR A PLASMA CUTTING TORCH

FIELD

The present disclosure relates to plasma arc torches and more specifically to tips, or nozzles, for use in a drag cutting mode of plasma arc torches.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and subsequently ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

Manual plasma arc cutting torches can be operated in a variety of modes, including both standoff and drag cutting modes. With standoff cutting, an operator attempts to maintain a constant distance, or standoff, from the end of the tip or nozzle to the workpiece. If the distance becomes too large, the plasma stream diameter increases and thus the energy density decreases, which renders the plasma stream less effective in cutting the workpiece. Additionally, as the system is operating with a constant current, a higher voltage will be required with increasing distance, and if the distance becomes too large, the power supply will eventually shut off. On the other hand, if the distance between the tip and the workpiece becomes too small, molten metal may bridge the gap between the tip and the workpiece and result in double arcing. In this case, the tip becomes grounded and the flow of plasma is disturbed, which could lead to failure of the tip. Many plasma arc torches have employed a separate shield device to surround the tip and provide protection against the molten metal. The shield devices also provide some cooling to components at the front end of the plasma arc torch and can thus improve performance and life of the consumable components.

In the drag cutting mode, a front face of the tip is held in contact with the workpiece in order to maintain the constant standoff or distance between the tip and the workpiece. Drag cutting, however, results in mechanical abrasion of the tip from dragging, especially when the workpiece contains surface discontinuities. Heat from initiating the pilot arc is also detrimental to the tip since it is in contact with the workpiece, and molten metal often travels back up to the tip during operation. Heat that is transferred to the tip during operation is also detrimental due to the close proximity of the tip to the workpiece, and double arcing often occurs at the end of a cut as the tip is separated from the workpiece. These deleterious effects are only magnified when cutting at higher current levels, and as such, drag cutting is often limited to less than about 40 amps.

SUMMARY

In one form of the present disclosure, a drag tip is provided that comprises an inner tip portion having a distal end face, an inner cavity through which a plasma gas flows, and an orifice disposed between the distal end face and the inner cavity. An outer tip portion surrounds the inner tip portion and defines an inner chamber to accommodate a flow of secondary gas, and the outer tip portion also defines a distal end portion. The distal end face of the inner tip portion is adapted for contact with a workpiece and extends distally beyond the distal end portion of the outer tip portion. The flow of secondary gas exits the outer tip portion proximate the distal end portion.

In another form of the present disclosure, a drag tip is provided that comprises at least one outer tip portion that is offset proximally from a distal end face of the tip. A deflecting wall is disposed proximate a distal end portion of the tip, and the deflecting wall directs a flow of shield gas along and away from the distal end portion of the tip.

In yet another form, a drag tip is provided that comprises an inner tip member defining a distal end face, an inner cavity through which a plasma gas flows, and an orifice disposed between the distal end face and the inner cavity, wherein the orifice transitions to an enlarged recessed area proximate the distal end face. An outer tip member surrounds the inner tip member, and a distal end face of the inner tip member is adapted for contact with a workpiece and extends distally beyond a distal end portion of the outer tip member. A flow of secondary gas exits the outer tip member proximate the distal end portion and is angled outwardly.

According to a method of the present disclosure, a plasma arc torch is operated in a drag cutting mode. The method comprises directing a flow of secondary gas along a distal end portion of a drag tip, subsequently directing the flow of secondary gas away from the distal end portion of the drag tip a distance proximal from a workpiece, and directing the flow of secondary gas against the workpiece.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
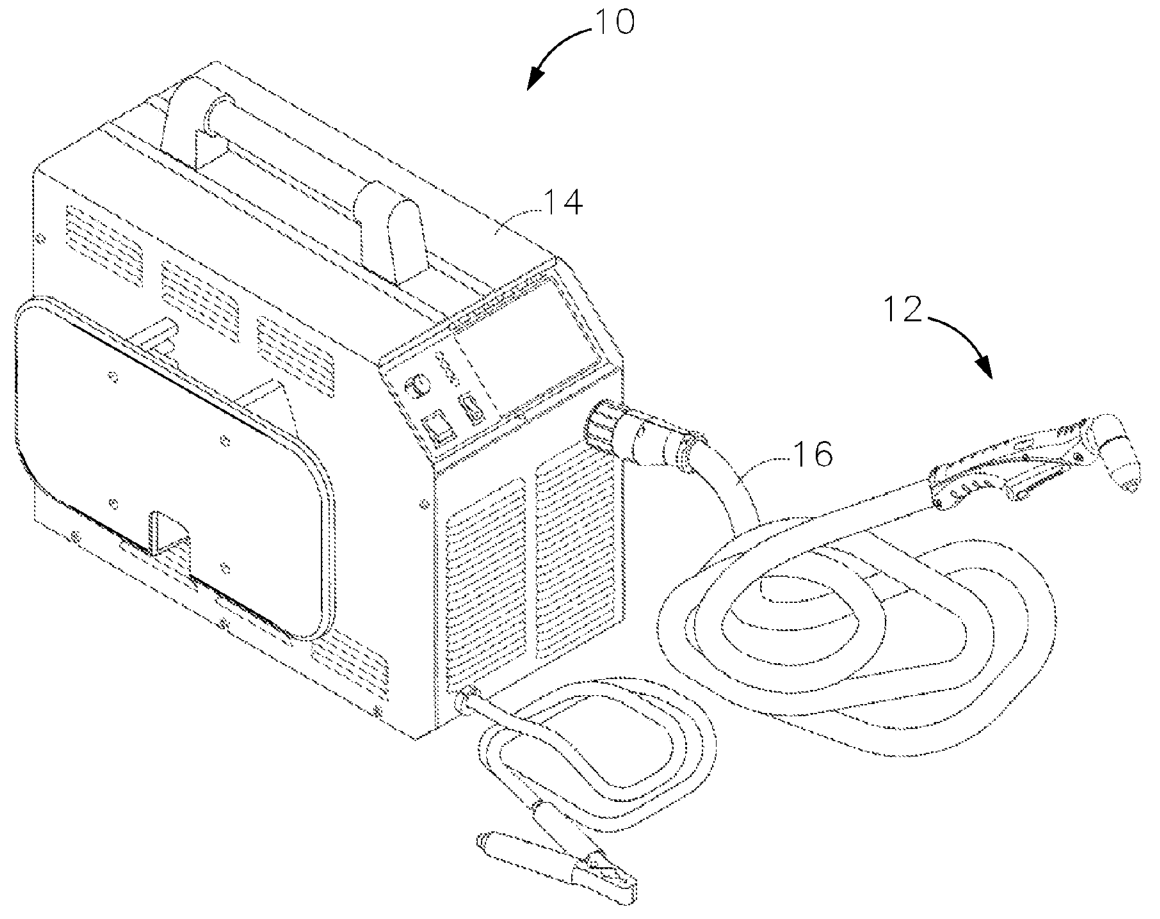
FIG. 1 is a perspective view of a manual plasma cutting apparatus in accordance with the principles of the present disclosure.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Figure 2:
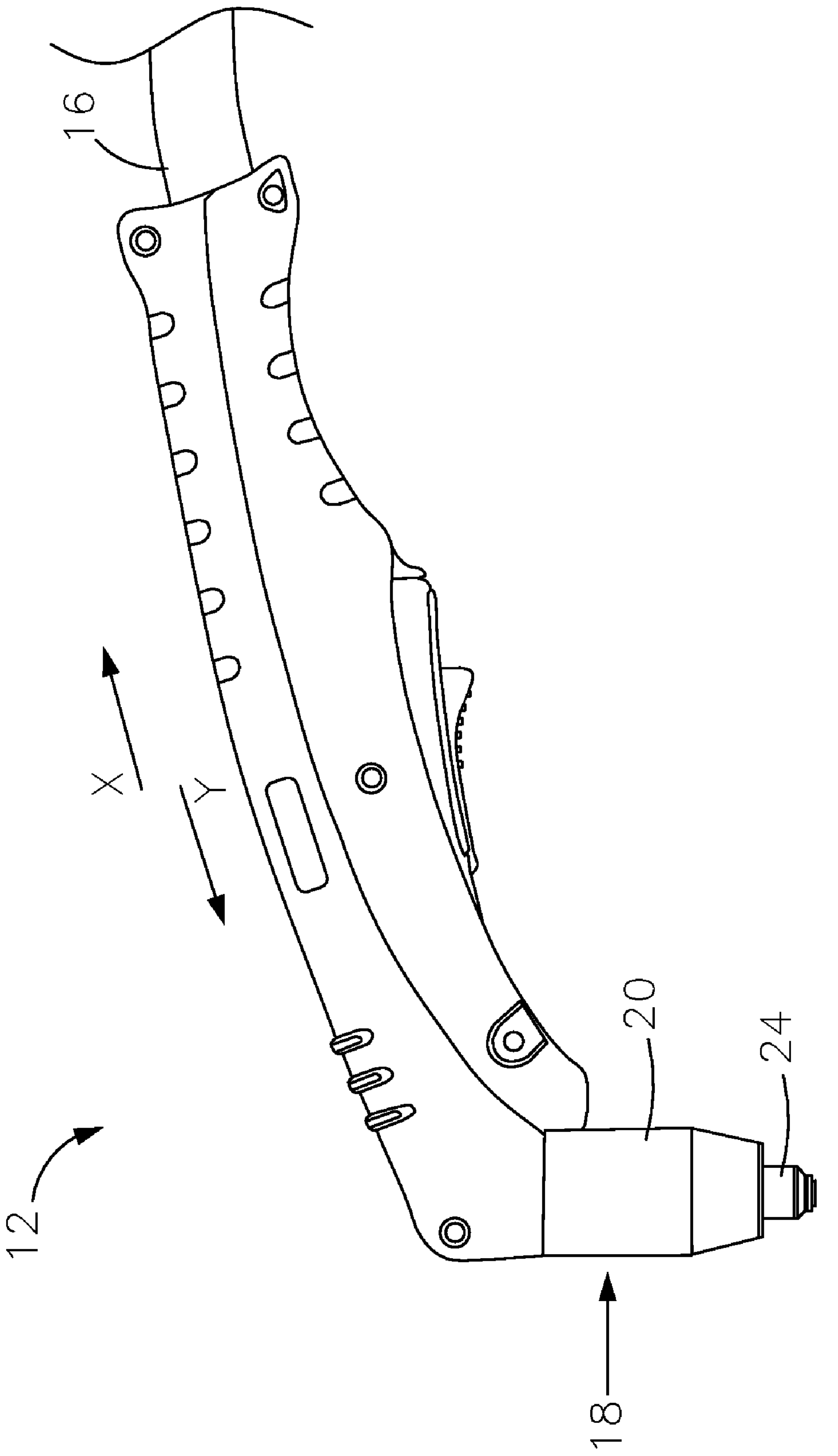
FIG. 2 is a side view of a manual plasma arc torch constructed in accordance with the principles of the present disclosure.

Referring to FIGS. 1 and 2, a manual plasma cutting apparatus is illustrated and generally indicated by reference numeral 10. The plasma cutting apparatus 10 generally comprises a plasma arc torch 12 that is operatively connected to a power supply 14 through a torch lead 16. The power supply 14 provides both gas and electric power, which flows through the torch lead 16, for operation of the plasma arc torch 12. Operation of an exemplary plasma arc torch 12 is described in greater detail in U.S. Pat. Nos. 6,703,581 and 6,936,786, which are commonly assigned with the present application and the contents of which are incorporated herein by reference in their entirety.

As used herein, a plasma arc apparatus, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, as used herein, the words "proximal direction" or "proximally" is the direction as depicted by arrow X, towards an operator, and the words "distal direction" or "distally" is the direction as depicted by arrow Y, towards the workpiece (not shown).

Figure 3:
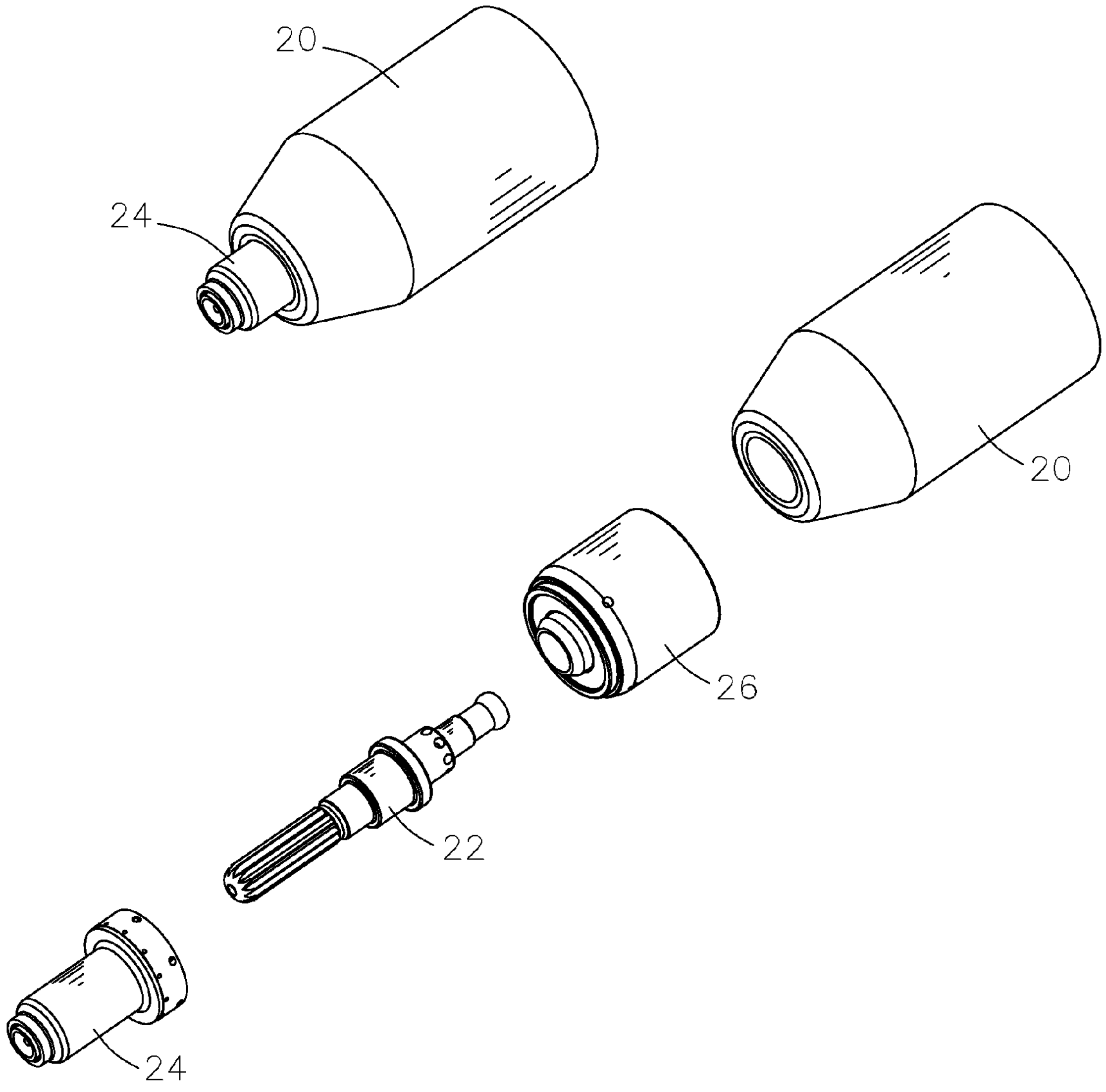
FIG. 3 is an exploded perspective view of distal end components of a plasma arc torch constructed in accordance with the principles of the present disclosure.
Figure 4:
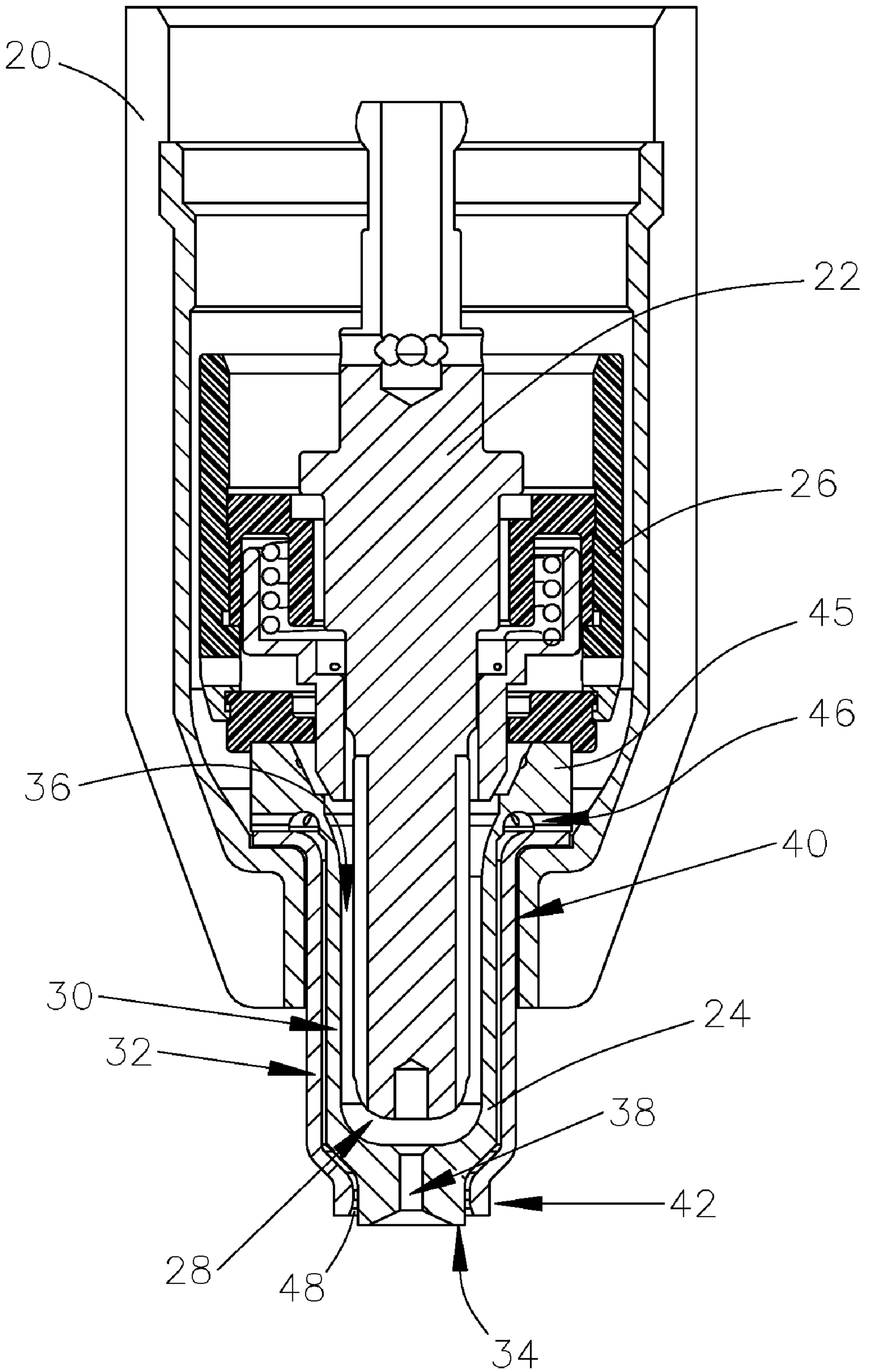
FIG. 4 is a cross-sectional view of the distal end components of a plasma arc torch in accordance with the teachings of the present disclosure.
Figure 5:
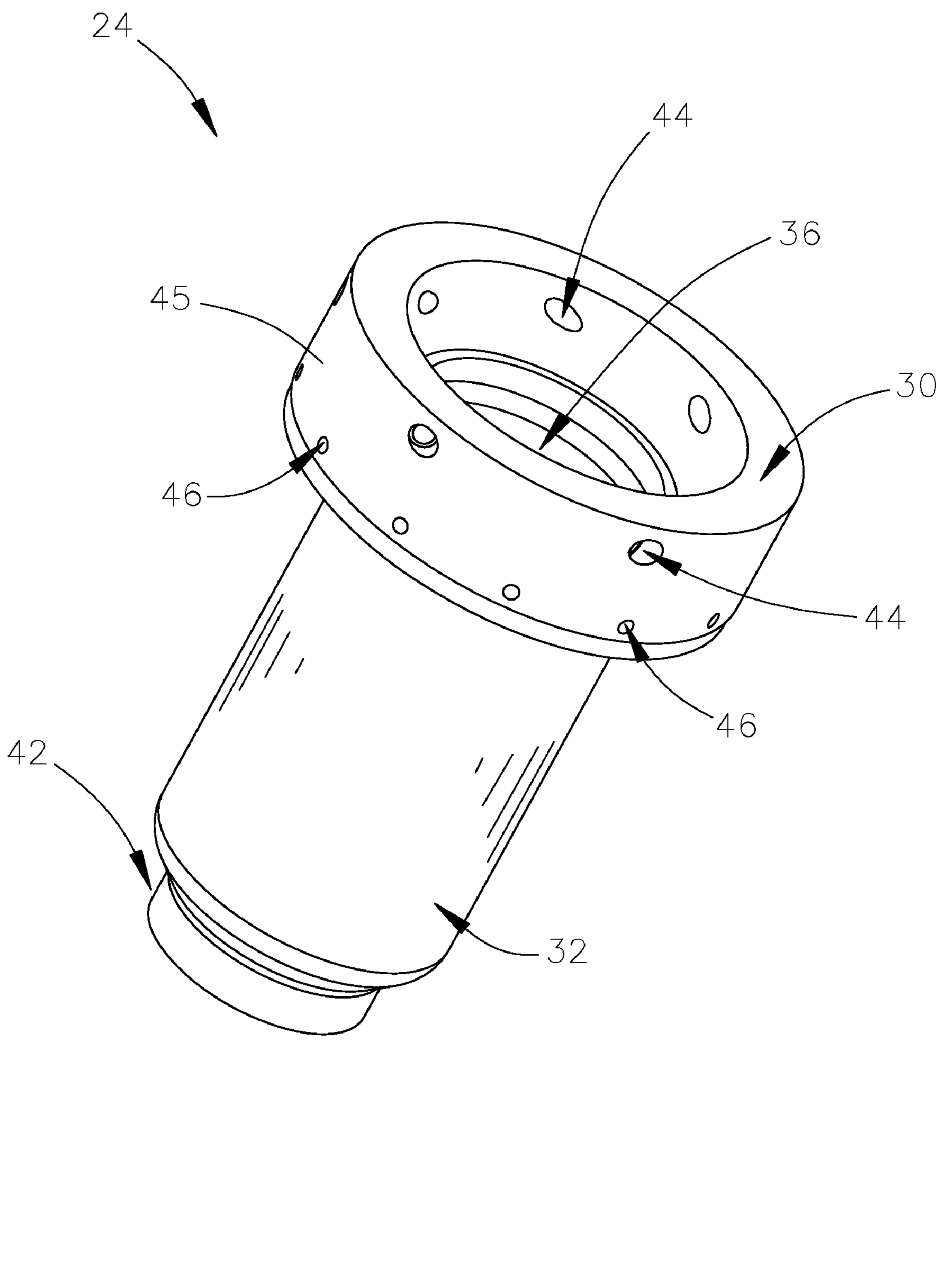
FIG. 5 is a perspective view of a drag tip constructed in accordance with the principles of the present disclosure.
Figure 6:
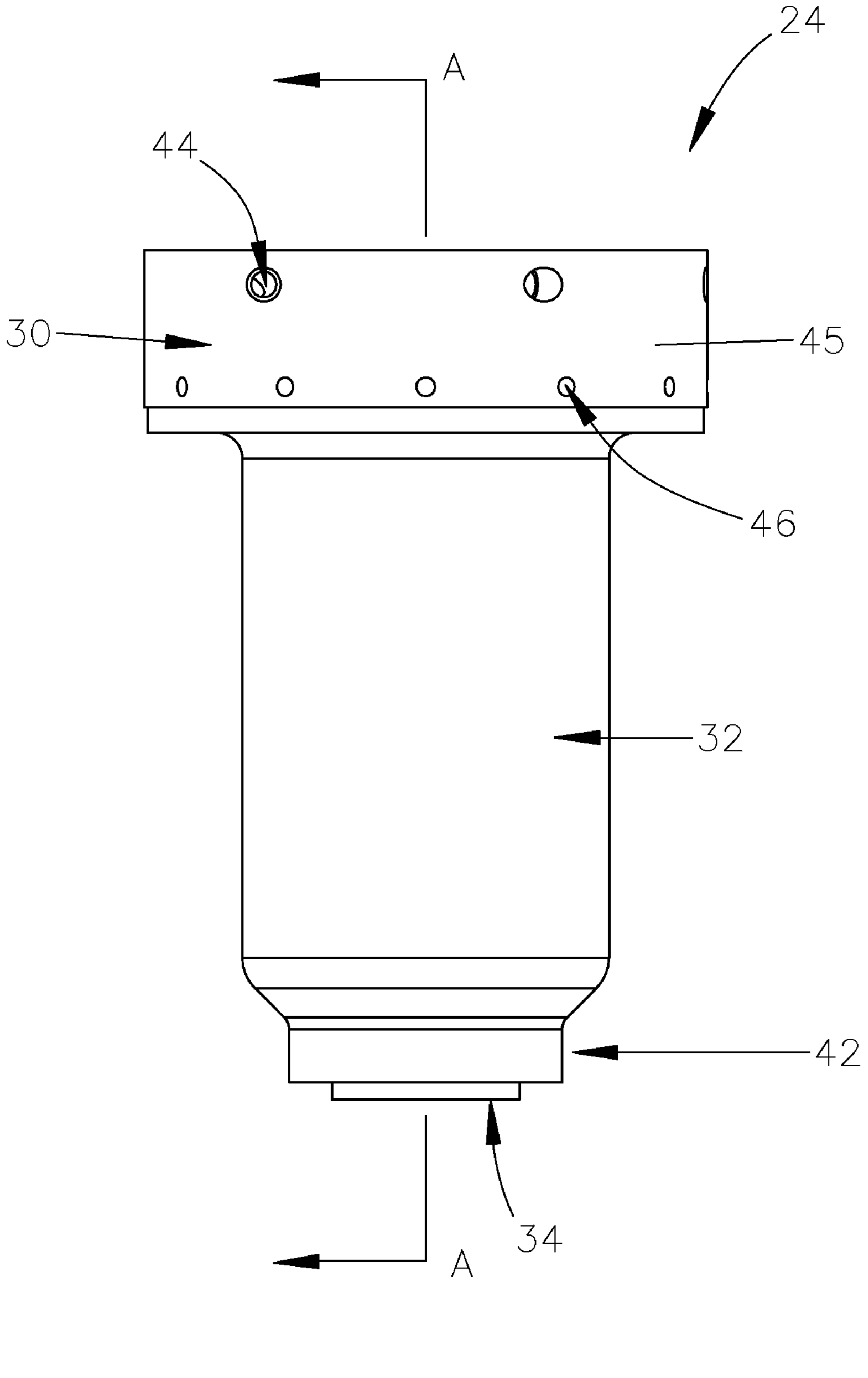
FIG. 6 is a side view of the drag tip in accordance with the teachings of the present disclosure.
Figure 7:
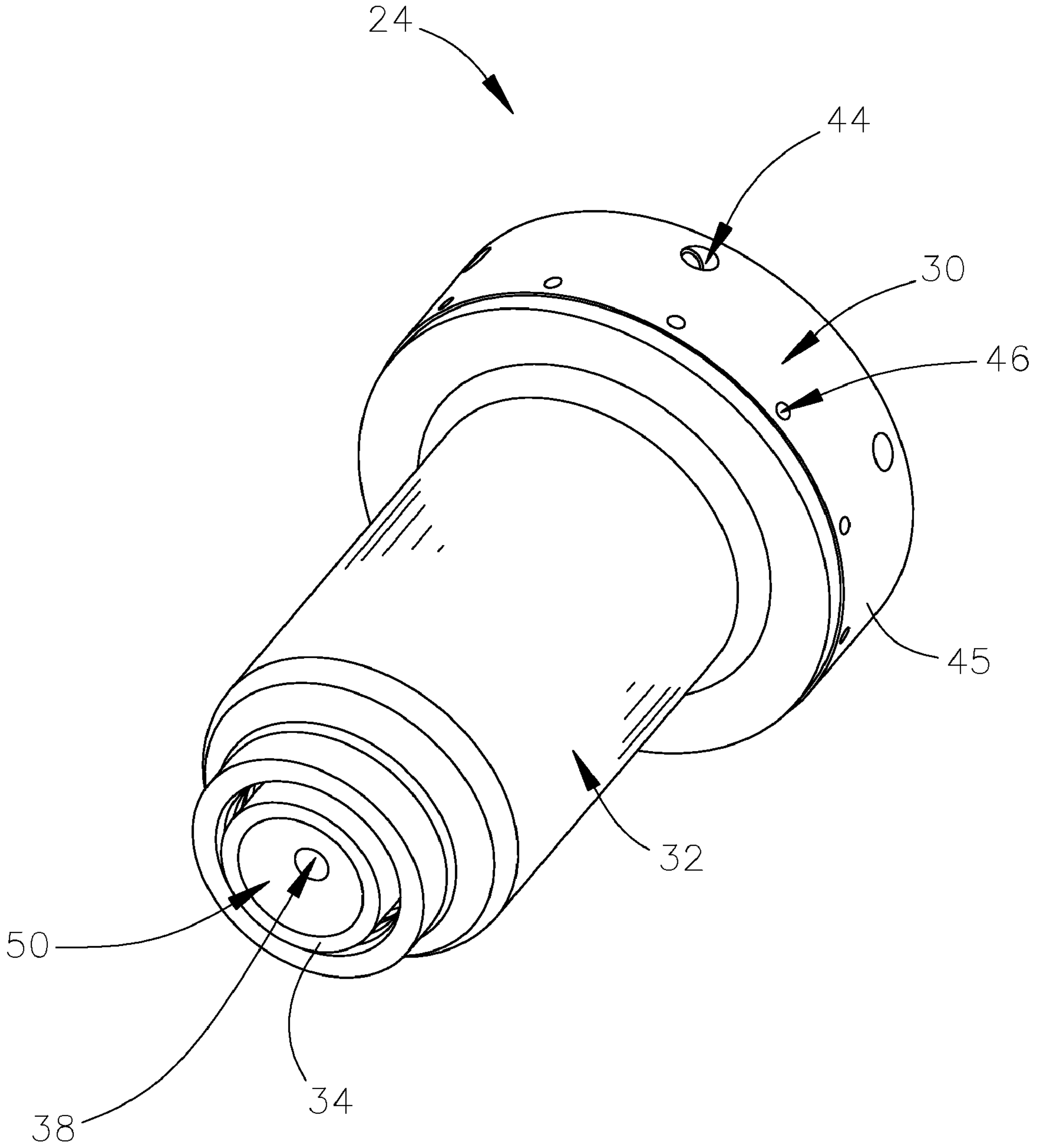
FIG. 7 is a bottom perspective view of the drag tip in accordance with the teachings of the present disclosure.

Referring now to FIGS. 2 through 4, the plasma arc torch 12 includes a plurality of components disposed at a distal end portion 18, which are removably secured to and located relative to the plasma arc torch 12 by a retaining cap 20. An electrode 22 and a tip 24 are disposed within the retaining cap

20 and are separated by a start cartridge 26 (or a gas distributor in other forms of plasma arc torches) to form a plasma arc chamber 28 therebetween. The electrode 22 is adapted for electrical connection to a cathodic, or negative, side of a power supply (not shown), and the tip 24 is adapted for electrical connection to an anodic, or positive, side of a power supply during piloting. As power is supplied to the plasma arc torch 12, a pilot arc is created in the plasma arc chamber 28, which heats and subsequently ionizes a plasma gas that is directed into the plasma arc chamber 28 through the start cartridge 26. The ionized gas is blown out of the plasma arc torch 12 and appears as a plasma stream that extends distally off the tip 24.

The tip 24 in accordance with the teachings of the present disclosure is referred to hereinafter as a "drag tip," wherein the drag tip 24 is adapted for contact with a workpiece during cutting operations as set forth in the Background discussion above. As shall be understood from the following description, the drag tip 24 is capable of operating at high current levels, namely, greater than about 40 amps, which has not yet heretofore been accomplished with drag tips in the art. Therefore, the drag tip 24 in accordance with the teachings of the present disclosure is capable of cutting thicker workpieces, cutting at higher speeds, and can have improved life over known drag tips. It should be understood, however, that the drag tip 24 as described herein can be employed at lower amperages ($\leqq$40 amps) while remaining within the scope of the present disclosure.

Figure 8:
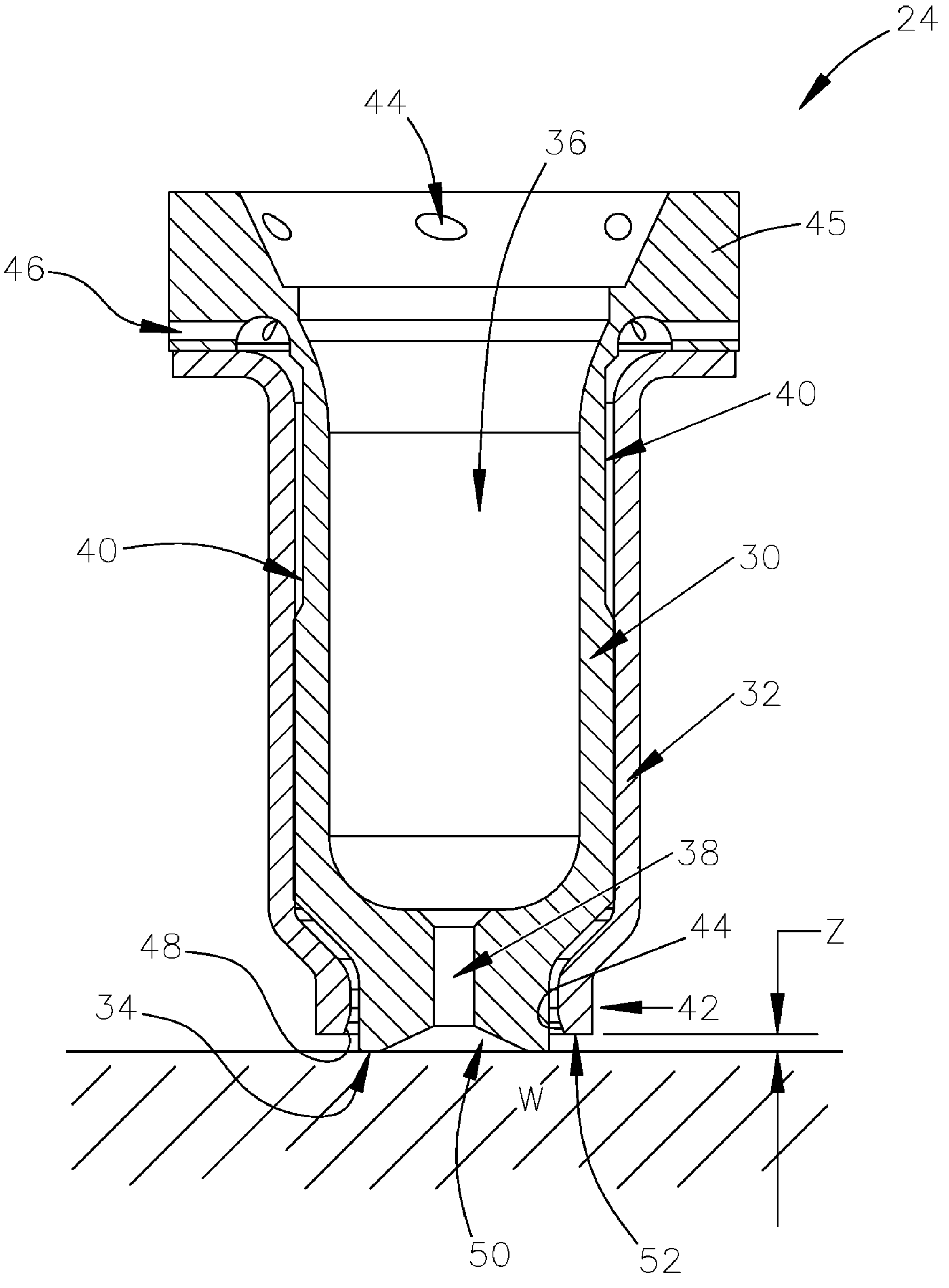
FIG. 8 is a cross-sectional view, taken along line A-A of FIG. 6, of the drag tip in accordance with the teachings of the present disclosure.

Referring specifically to FIG. 8, and also FIGS. 4-7, the drag tip 24 comprises an inner tip portion 30 and an outer tip portion 32. The inner tip portion 30 defines a distal end face 34, an inner cavity 36 through which a plasma gas flows, and an orifice 38 disposed between the distal end face 34 and the inner cavity 36. The outer tip portion 32 surrounds the inner tip portion 30 as shown and defines an inner chamber 40 to accommodate a flow of secondary gas. The outer tip portion 32 also defines a distal end portion 42 as shown that is offset proximally from the distal end face 34 of the inner tip portion 30. The distal end face 34 of the inner tip portion 30 is adapted for contact with a workpiece W and extends distally beyond the distal end portion 42 of the outer tip portion 32.

In operation, a flow of plasma gas is directed through plasma gas passageways 44 formed through an annular collar 45 of the drag tip 24, which then flows into the inner cavity 36 of the inner tip portion 30. A flow of secondary gas is directed through secondary gas passageways 46, which are also formed through the annular collar 45 in one form of the present disclosure, which then flows into the inner chamber 40 of the outer tip portion 32. Further details and operation of an exemplary tip with both plasma gas passageways and secondary gas passageways is set forth in U.S. Pat. Nos. 7,145,099 and 6,774,336, which are commonly assigned with the present application and the contents of which are incorporated herein by reference in their entirety.

The secondary gas continues to flow through the inner chamber 40 and exits the outer tip portion 32 proximate the distal end portion 42. In one form, the distal end portion 42 of the outer tip portion 32 defines a distal inner wall 48 that is angled outwardly as shown, such that the secondary gas is subsequently directed away from the inner tip portion 30 and against the workpiece W. Advantageously, the flow of secondary gas close to, or proximate, the distal end face 34 of the inner tip portion 30 improves cooling of the drag tip 24, and subsequently directing the secondary gas flow away from the inner tip portion 30 reduces the possibility of the secondary gas disturbing the plasma stream during cutting. The flow of secondary gas in this manner further improves cooling of the workpiece W. Moreover, the effect of double arcing at the end of the cut, when the drag tip is moved away from the workpiece W, is reduced by the flow of secondary gas.

As further shown, the orifice 38 of the inner tip portion 30 transitions to an enlarged recessed area 50 proximate the distal end face 34 in one form of the present disclosure. The enlarged recessed area 50 reduces the possibility of double arcing, aids in cooling of the drag tip 24, and protects the orifice 38 from being gouged during cutting. The enlarged recessed area 50 may take the angled shape as illustrated herein, or it may take other shapes such as that disclosed in U.S. Pat. No. 5,266,766, which is commonly assigned with the present application and the contents of which are incorporated herein by reference in their entirety.

In one exemplary form, the distal end face 34 of the inner tip portion 30 extends distally beyond the distal end portion 42 of the outer tip portion 32, and more specifically a distal end face 52 of the outer tip portion 32, a nominal distance of greater than or equal to about 0.010 inches (0.025 cm). In another form, the distal end face 34 extends a nominal distance of about 0.020 inches (0.050 cm) beyond the distal end portion 42 of the outer tip portion 32. It should be understood that these values are merely exemplary and are not to be construed as limiting the scope of the present disclosure.

Figure 9:
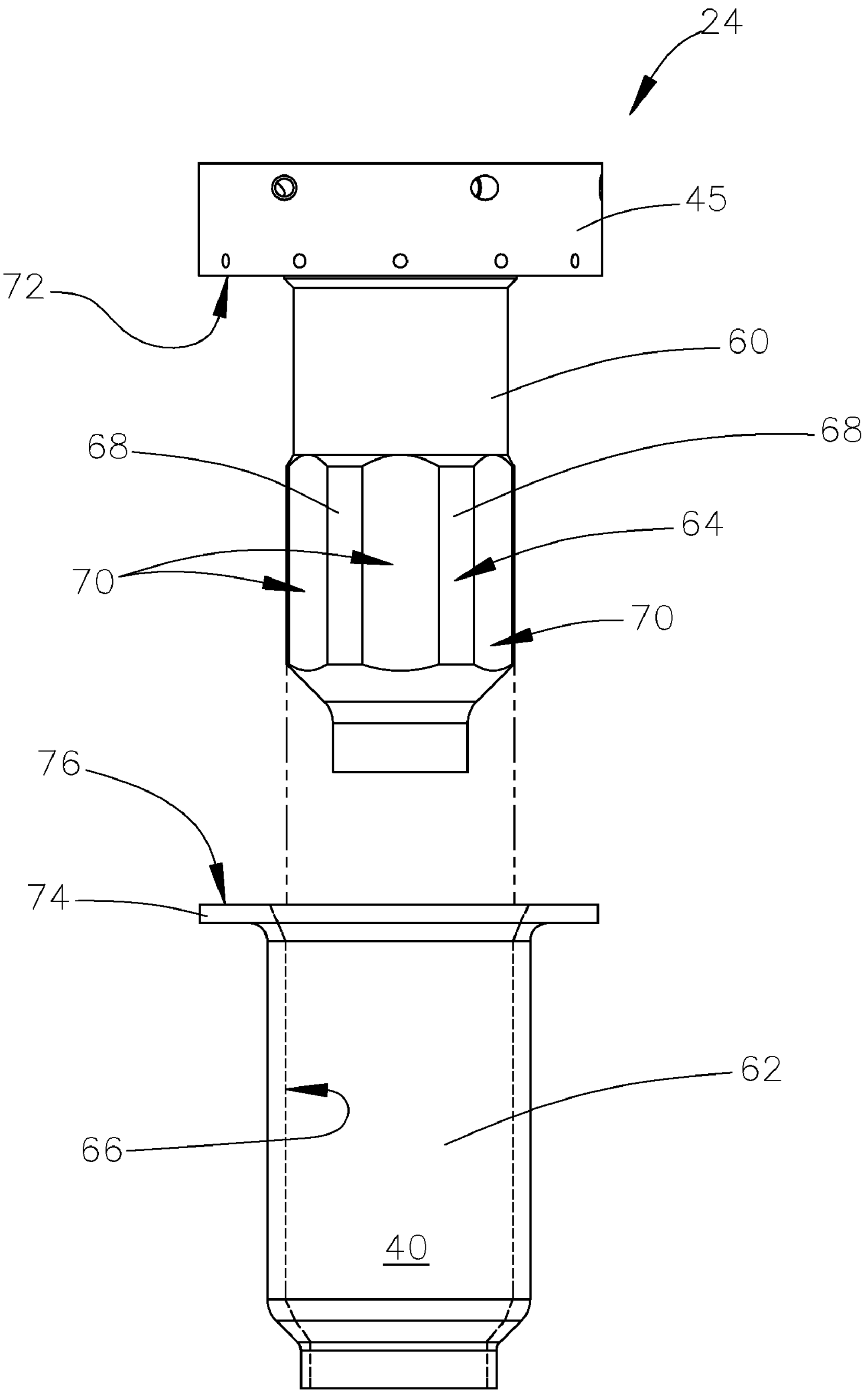
FIG. 9 is an exploded side view of one form of the drag tip constructed in accordance with the principles of the present disclosure.

As shown in FIG. 9, the drag tip 24 in one form comprises separate pieces, namely, an inner tip member 60 and an outer tip member 62. In one form, the inner tip member 60 defines a faceted outer wall 64 that engages an inner wall 66 (shown dashed) of the outer tip member 62 to secure the pieces together in a press-fit manner. More specifically, the faceted outer wall 64 of the inner tip member 60 defines ridges 68 and grooves 70. The ridges 68 physically engage the inner wall 66 of the outer tip member 62 to secure the pieces together, and the grooves 70 facilitate the flow of secondary gas through the inner chamber 40 of the outer tip member 62. It should be understood that with separate pieces for the drag tip 24, the pieces may be joined by any of a variety of methods, including by way of example, threads, welding, and adhesive bonding, among others. Such joining techniques shall be construed as being within the scope of the present disclosure.

As further shown, the inner tip member 60 defines a distal face 72 formed around the annular collar 45, and the outer tip member 62 comprises an annular flange 74 having a corresponding proximal face 76. When the inner tip member 60 is joined with the outer tip member 62, the distal face 72 of the inner tip member 60 abuts the proximal face 76 of the outer tip member 62 to position the two pieces relative to each other in this form of the present disclosure. Furthermore, the outer tip member 62 defines a constant thickness (shown in FIG. 8) in one form of the present disclosure in order to facilitate more economical fabrication processes such as stamping.

In another form, the inner tip portion 30 and the outer tip portion 32 define a unitary piece, which may be machined by way of example, to achieve the features as described herein. Such alternate forms of the drag tip shall be construed as falling within the scope of the present disclosure.

Figure 10:
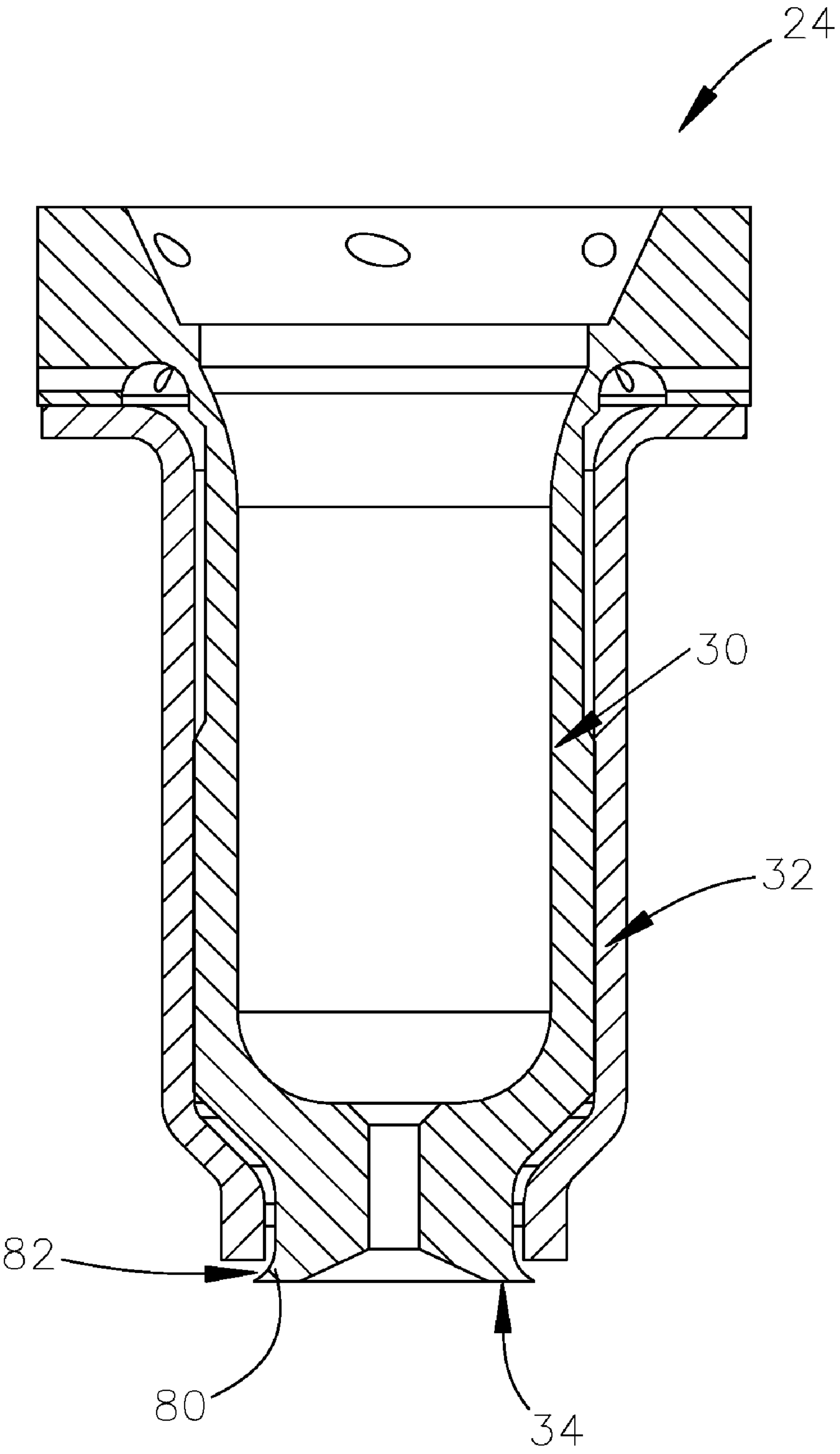
FIG. 10 is a cross-sectional view of an alternate form of a drag tip constructed in accordance with the principles of the present disclosure.

Referring now to FIG. 10, the secondary gas may be directed away from the distal end face 34 of the drag tip 24 with an alternate feature such as a skirt 80 formed around a distal end portion 82 of the inner tip portion 30, rather than the angled inner wall 48 of the outer tip portion 32 as previously illustrated and described. Alternately, the angled inner wall 48 may be used in conjunction with the skirt 80 while remaining within the scope of the present disclosure. It should be understood that a variety of approaches may be employed to direct the secondary gas away from the distal end face 34 of the drag tip 24, and such approaches shall be construed as being within the scope of the present disclosure, provided that they function to subsequently direct the secondary gas away from the distal end face 34 of the inner tip portion 30 after the secondary gas has been directed along the distal end portion 82 of the inner tip portion 30.

Figure 11:
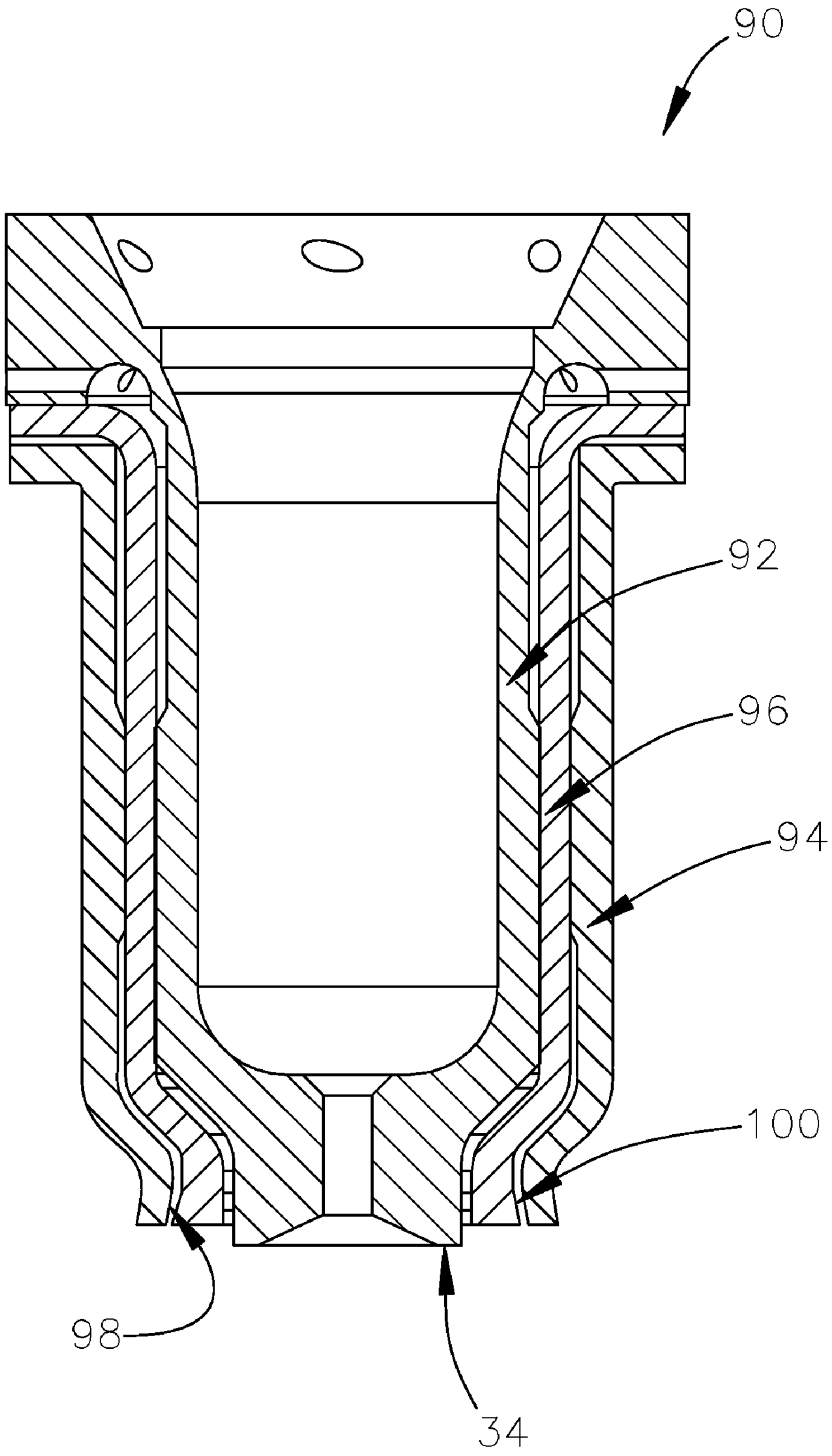
FIG. 11 is a cross-sectional view of another form of a drag tip constructed in accordance with the principles of the present disclosure.

Now referring to FIG. 11, yet another form of a drag tip is illustrated and generally indicated by reference numeral 90. The drag tip 90 comprises an inner tip portion 92, an outer tip portion 94, and an intermediate tip portion 96. The outer tip portion 94 and the intermediate tip portion 96 define angled walls 98 and 100, respectively, which direct the flow of secondary gas proximate yet away from the distal end face 34 of the inner tip portion 92. As such, more than the two (2) tip portions, (including even more than the three (3) as illustrated here), as previously set forth may be employed to achieve the desired flow of secondary gas in accordance with the teachings of the present disclosure. As such, the secondary gas can be provided from a plurality of gas sources and thus different types of gases can be used with the various embodiments of drag tips 24 as illustrated and described herein. The different gases, which may include by way of example, air, nitrogen, argon, and H35, among others, may also be mixed or provided independently of each other while remaining within the scope of the present disclosure. It should also be understood that the secondary gas may be provided from a single gas source while remaining within the scope of the present disclosure.

Figure 12:
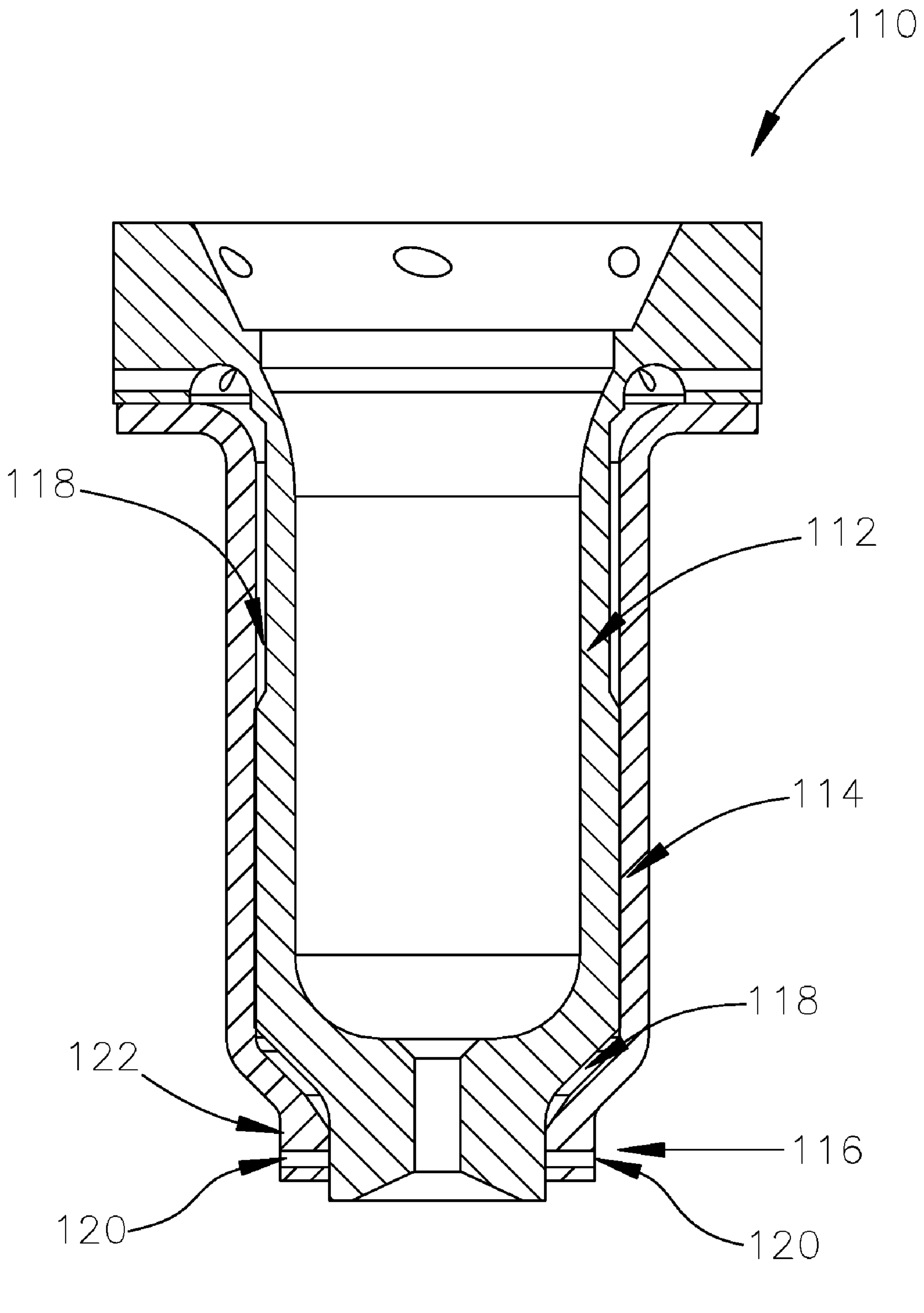
FIG. 12 is a cross-sectional view of still another form of a drag tip constructed in accordance with the principles of the present disclosure.

Yet another form of a drag tip is illustrated in FIG. 12 and is generally indicated by reference numeral 110. The drag tip 110 comprises an inner tip portion 112 and an outer tip portion 114. The outer tip portion 114 surrounds the inner tip portion 112 as shown and defines a distal end portion 116 and an inner chamber 118 to accommodate a flow of secondary gas as previously described. The secondary gas exits the outer tip portion 114 proximate the distal end portion 116 and is also directed away from the inner tip portion 112 as shown. More specifically, gas passageways 120 are formed through a distal outer wall portion 122 of the outer tip portion 114 as shown, wherein the secondary gas flows through the inner chamber 118 and is then redirected through the gas passageways 120, away from the inner tip portion 112. In this way, the secondary gas provides both cooling and blocking molten metal functions, while further reducing the possibility of disturbing the plasma stream during cutting since it is further away from the plasma stream than the previous embodiments.

In each of the exemplary forms as illustrated and described herein, the present disclosure contemplates the use of precipitation hardened copper alloys for both the inner tip portion 30 and the outer tip portion 32, and also the other tip portions as set forth herein. Such materials improve resistance to deformation and creep at high temperatures and are also wear resistant, which is a characteristic that is particularly desirable in drag cutting. By way of example, the alloys may be chromium, zirconium, chromium-zirconium, and silver, among others.

Additionally, the distal end face 34 of the inner tip member 30 in one form comprises a protective coating disposed over at least a portion thereof. The protective coating may be applied by a variety of processes, including by way of example, thermal spray (e.g., plasma spray), thin film (e.g., chemical vapor deposition, physical vapor deposition), sol-gel, and thick film, among others. Moreover, the distal end face 34 of the inner tip member 30 is water-cooled in another form of the present invention.

The description of the disclosure is merely exemplary in nature and, thus, variations that do not depart from the substance of the disclosure are intended to be within the scope of the invention. Such variations are not to be regarded as a departure from the spirit and scope of the invention.

What is claimed is:

1. A drag tip comprising:
an inner tip portion defining:
a distal end face;
an inner cavity through which a plasma gas flows; and
an orifice disposed between the distal end face and the inner cavity,
an outer tip portion surrounding the inner tip portion and defining:
an inner chamber disposed between the inner tip portion and the outer tip portion and inside the outer tip portion to accommodate a flow of secondary gas; and
a distal end portion,
wherein the distal end face of the inner tip portion is adapted for contact with a workpiece and extends distally beyond the distal end portion of the outer tip portion, and the flow of secondary gas exits the outer tip portion proximate the distal end portion.

2. The drag tip according to claim 1, wherein the distal end face of the inner tip portion extends distally beyond the distal end portion of the outer tip portion a nominal distance of greater than or equal to about 0.010 inches.

3. The drag tip according to claim 2, wherein the distal end face of the inner tip portion extends distally beyond the distal end portion of the outer tip portion a nominal distance of about 0.020 inches.

4. The drag tip according to claim 1, wherein the distal end portion of the outer tip portion defines a distal inner wall that is angled outwardly.

5. The drag tip according to claim 1, wherein the orifice of the inner tip portion transitions to an enlarged recessed area proximate the distal end face.

6. The drag tip according to claim 1, wherein the inner tip portion and the outer tip portion define separate pieces.

7. The drag tip according to claim 6, wherein the inner tip portion defines a faceted outer wall that engages an inner wall of the outer tip portion to secure the pieces together.

8. The drag tip according to claim 1, wherein the inner tip portion and the outer tip portion define a unitary piece.

9. The drag tip according to claim 1, wherein at least one of the inner tip portion and the outer tip portion are formed from a precipitation hardened copper alloy.

10. The drag tip according to claim 1 further comprising a protective coating disposed over at least a portion of the distal end face of the inner tip portion.

11. The drag tip according to claim 10, wherein the coating is applied by a process selected from the group consisting of thermal spray, thin film, sol-gel, and thick film.

12. The drag tip according to claim 1, wherein the distal end face of the inner tip portion is water-cooled.

13. A drag tip comprising:
a distal end face; and
at least one outer tip portion including an inner surface and a distal end portion, the distal end portion being offset proximally from the distal end face and including a deflecting wall,
wherein the deflecting wall is disposed proximate the distal end portion of the at least one outer tip portion and angled outwardly from the inner surface for directing a flow of shield gas along and away from the distal end face.

14. The drag tip according to claim 13, wherein the deflecting wall is formed in the outer tip portion.

15. The drag tip according to claim 13, wherein the deflecting wall is formed in an inner tip portion.

16. The drag tip according to claim 13 further comprising an orifice formed through the distal end face of the tip, wherein the orifice transitions to an enlarged recessed area proximate the distal end face.

17. The drag tip according to claim 13, wherein the tip is formed from a precipitation hardened copper alloy.

18. The drag tip according to claim 13 further comprising a protective coating disposed over at least a portion of the distal end face of the tip.

19. The drag tip according to claim 18, wherein the coating is applied by a process selected from the group consisting of thermal spray, thin film, sol-gel, and thick film.

20. The drag tip according to claim 13, wherein the distal end face of the inner tip member is water-cooled.

21. A drag tip comprising:
an inner tip member defining:
a distal end face;
an inner cavity through which a plasma gas flows; and
an orifice disposed between the distal end face and the inner cavity, the orifice transitioning to an enlarged recessed area proximate the distal end face, and
an outer tip member surrounding the inner tip member to define an inner chamber between the inner tip member and the outer tip member and inside the outer tip member;
wherein a distal end face of the inner tip member is adapted for contact with a workpiece and extends distally beyond a distal end portion of the outer tip member, and a flow of secondary gas flows through the inner chamber and exits the outer tip member proximate the distal end portion and is angled outwardly.

22. The drag tip according to claim 21, wherein the inner tip member defines a faceted outer wall that engages an inner wall of the outer tip member to secure the inner tip member to the outer tip member.

23. The drag tip according to claim 21 further comprising a protective coating disposed over at least a portion of the distal end face of the inner tip member.

24. A method of operating a plasma arc torch in a drag cutting mode, the plasma arc torch including a drag tip having a distal end face and a distal portion that is offset proximally from the distal end face, the method comprising:
directing a flow of secondary gas inside the drag tip and along the distal end portion of the drag tip;
subsequently directing the flow of secondary gas away from the distal end portion of the drag tip a distance proximal from a workpiece; and
directing the flow of secondary gas against the workpiece.

25. The method according to claim 24, wherein the secondary gas is provided from a plurality of gas sources having different types of gases.

* * * * *